US008706291B2

(12) United States Patent
Bürger et al.

(10) Patent No.: US 8,706,291 B2
(45) Date of Patent: Apr. 22, 2014

(54) MODULAR AUTOMATED TOOL DISPENSER

(75) Inventors: Hans Bürger, Schorndorf (DE); Steffen Klaus Lang, Albstadt-Tailfingen (DE)

(73) Assignee: Guehring OHG, Albstadt (DE)

( * ) Notice: Subject to any disclaimer, the term of this patent is extended or adjusted under 35 U.S.C. 154(b) by 55 days.

(21) Appl. No.: 13/219,040

(22) Filed: Aug. 26, 2011

(65) Prior Publication Data

US 2012/0048878 A1 Mar. 1, 2012

Related U.S. Application Data

(63) Continuation of application No. PCT/DE2010/000219, filed on Mar. 1, 2010.

(30) Foreign Application Priority Data

Feb. 27, 2009 (DE) ......................... 10 2009 010 880

(51) Int. Cl.
*G06F 17/00* (2006.01)

(52) U.S. Cl.
USPC ........... 700/236; 700/241; 700/242; 700/237; 221/92; 221/133; 221/123; 221/125; 221/124

(58) Field of Classification Search
USPC ............ 700/231, 236, 237, 241, 242; 221/92, 221/123, 124, 125, 130, 133, 131
See application file for complete search history.

(56) References Cited

U.S. PATENT DOCUMENTS 4,423,827 A * 1/1984 Guigan ......................... 221/129
5,172,829 A 12/1992 Dellicker, Jr.
5,205,436 A * 4/1993 Savage .......................... 700/236
5,940,306 A * 8/1999 Gardner et al. ............... 700/244
6,587,748 B2 * 7/2003 Baack ........................... 700/237
6,735,497 B2 * 5/2004 Wallace et al. ............... 700/231
7,086,558 B1 * 8/2006 Pixley et al. ...................... 221/9
7,121,427 B2 * 10/2006 Guerra .......................... 221/126
2004/0104652 A1 6/2004 Holmes et al.
2007/0023193 A1 2/2007 King
2007/0205704 A1 9/2007 Hsieh
2008/0129172 A1 6/2008 Freeberg et al.
2008/0129173 A1 6/2008 Freeberg et al.
2008/0309583 A1 12/2008 Hsieh

FOREIGN PATENT DOCUMENTS

| | | |
|---|---|---|
| EP | 1 256 913 | 11/2002 |
| GB | 921243 | 3/1963 |
| WO | 2005/028165 | 3/2005 |
| WO | 2006/113533 | 10/2006 |
| WO | 2008/067510 | 6/2008 |

* cited by examiner

*Primary Examiner* — Timothy Waggoner
(74) *Attorney, Agent, or Firm* — Burr & Brown, PLLC

(57) ABSTRACT

The invention relates to a modular automated tool dispenser comprising at least one tool delivery module with at least one tool compartment containing a plurality of tools that are combined to form tool classes and with a plurality of tool conveying devices, each device being associated with one of the tool classes and conveying tools of one class to a tool delivery point. Each tool class is defined by the tool type, tool size and/or the tool weight as a tool parameter. The dispenser also comprises a tool selection device for selecting the desired tool class and the number of tools to be delivered and for activating the tool conveying device that is associated with the selected tool class.

33 Claims, 18 Drawing Sheets

MODULAR AUTOMATED TOOL DISPENSER

The present invention relates to a modular automated tool dispenser and a method for delivering tools according to the preamble of claim 1 and claim 27 respectively.

Automated tool dispensers enable rapid access to tools and tool accessories and a reduction in tool costs. They also permit a controlled delivery of tools to authorised persons and, by means of integrated software, an overview at all times of the consumption of individual tools and therefore of their time in service and qualities. Through the automation of automated tool dispensers, furthermore, a 24-hour tool access is possible, i.e. also during shift working times, without intensive labour costs. Experience has shown, moreover, that tool wear is greatly reduced by the use of automated tool dispensers, since—depending on the system—each employee is personally responsible for his tool and can be recorded at the time of delivery. Cost savings of 20% to 40% are realistic. Furthermore, it is known to entrust tool management using such a system to an external firm, wherein the latter can be informed at all times regarding the current stock of tools and automatically resupply the latter by means of the integrated software and a suitable network.

The known automated tool dispensers, however, have the drawback of a lack of flexibility and inadequate adaptation capability to individual and plant-organisational requests, requirements and changes, so that the potential of the aforementioned advantages cannot be fully utilised.

It is therefore a problem of the present invention to overcome the aforementioned drawbacks.

This problem is solved by the features of claims 1 and 27. Advantageous embodiments are defined in the sub-claims.

According to a first aspect of the invention, an automated tool dispenser comprises at least one tool delivery module with at least one tool compartment, in which a plurality of tools combined to form tool classes are arranged, and with a plurality of tool conveying devices, which are each associated with one of the tool classes and convey tools of one class to a tool delivery point, wherein the tool classes are each defined by the tool type, the tool size and/or the tool weight as tool parameters, and with a tool selection device for selecting the desired tool class and number of tools to be delivered and for activating the tool conveying device that is associated with the selected tool class.

According to the invention, each automated tool dispenser comprises at least one tool delivery module with at least one tool compartment, in which tools are arranged sorted according to tool classes, wherein each tool compartment can contain tools of only one tool class or tools of a plurality of tool classes. If there are present in a tool compartment only tool classes which, together with their associated tool conveying devices, are comparable in their dimensions determining the respective tool compartment size, the tool compartment size does not have to be adapted to the largest tool class contained therein, which has an advantageous effect on the size of the automated tool dispenser. The tool conveying device forms the smallest "ordinal unit" of the automated tool dispenser according tool the invention: A plurality of tool conveying devices are grouped together in a tool compartment, at least one tool compartment in turn forms a module, and at least one module in turn forms a "delivery part" of the automated tool dispenser, with which the tool selection device, advantageously as a further module, is connected. Or to put it another way: The modular concept progresses from the exterior inwards. Depending on the plant organisation, the space availability etc., priority can be given to one or more of the aforementioned tool parameters. A tool parameter "tool type" is for example a drill bit, a milling cutter etc. A tool parameter "tool size" is for example a drill bit diameter, a grinding wheel diameter, the fineness of a grinding tool etc. In particular, the tool selection device, which can be constituted as a control panel, a keyboard, a touch-screen etc., is not excluded from the modular concept. The tool selection device can also be equipped with a printer for printing out logs or records of removals.

Through the features of claim 2 of the present invention, a plurality of identical, in particular smaller tools such as indexable cutting inserts, i.e. tools which correspond in all parameters, are grouped together in packages, referred to herein as tool units, so that such tools are not delivered individually. This therefore takes account of the fact that smaller tools wear more quickly and therefore need to be replaced more frequently. It is therefore advantageous, also in order to keep travelling times between a machine tool and the automated tool dispenser according to the invention as short as possible, not to deliver such tools individually. A further advantage consists in the fact that the tools, which are preferably kept packaged in the automated tool dispenser, do not then have to be individually packaged.

Through the features of claim 3 of the present invention, each of a plurality of tool compartments arranged in a tool delivery module in a suitable but basically arbitrary manner has assigned to it its own tool delivery point. Particularly when only tools of a tool class defined as completely as possible by tool type, tool size and tool weight, i.e. only drill bits of a well-defined size range for example, are contained in a tool compartment, this has the advantage on the one hand that a targeted access to the given compartment is possible for the worker, and on the other hand the advantage—especially when the tool class is defined by the tool size—that the individual tool compartments can be arranged in a space-saving manner and therefore in a greater number inside the tool delivery module.

Through the features of claim 4 of the present invention, there is again the advantage that the automated tool dispenser according to the invention can be designed more simply and therefore less susceptible to malfunction and therefore more cost-effectively both in terms of purchase and maintenance, since the number of tool delivery points is thus reduced. Similar tools are then advantageously contained in the tool compartments associated with a given tool delivery point, i.e. tool classes, to which these tools are assigned, correspond in a number of the aforementioned parameters.

Leading on from the features of claim 4, claim 5 defines an arrangement of the tools inside the tool delivery module, wherein a common tool delivery point is associated with a plurality of tool compartments. It is assumed, for example, that the tool compartments are arranged above one another and the tool delivery point is located essentially at the same height as the lowest tool compartment. It is therefore advisable for the heaviest tools to the placed as low down as possible. Furthermore, the drop height and therefore the hardness of the impact of the tool can be reduced by a suitable constitution of the tool delivery point (see below).

Whereas an arrangement is defined by the features of claim 5, according to which the tools are arranged inside a tool delivery module with a tool delivery point common to all the tool compartments accommodated therein, wherein the tools are arranged in a position lower down the heavier they are in order to avoid damage to the tool and/or to the automated tool dispenser, the features of claim 6 are directed towards the health of the worker and therefore not to the "relative" position inside the tool delivery module, but rather to the "absolute" position inside the automated tool dispenser. Here, priority is given to the parameter "weight" over the parameters type and size when arranging the tool in the automated tool dispenser. If the automated tool dispenser according to the invention contains a plurality of tool compartments, which can all be arranged in one tool delivery module or distributed over a plurality of tool delivery modules, it is advantageous against this background to form the tool classes contained therein from tools which essentially correspond in the parameter weight, and to arrange these tools or tool classes at heights and in positions which enable ergonomic removal by the worker.

Through the features of claims 7 and 8, the tool can easily be removed upwards, which is the case especially with heavy tools, without the need to grasp into the automated tool dispenser, e.g. into a shaft. The tool is therefore clearly visible and can be gripped in a favourable manner. It should be noted that, according to claim 7, the tool delivery point is constituted in the form of a "swivellable channel", whereas according to claim 8 it is constituted in the form of a "flap which can be folded about a horizontal axis". In the first case (claim 7), the tool delivery point itself forms a "collection container", into which the selected tool falls down, whereas in the second case (claim 8) the tool delivery point as a flap merely enables access to an area into which the delivered tool falls after the selection has been made.

Through the design of the tool delivery point as a drawer (in short "drawer-like tool delivery point"), as it is defined in claim 9, there are—apart from the existing and aforementioned possibility—further possibilities for arranging the tool delivery point relative to the tool conveying device(s); the tools can be conveyed in a different way from the respective tool compartment into the (claim 7) or to the (claim 8) tool delivery point. That is to say that, according to claims 7 and 8, a tool located farther back in the tool compartment has to be conveyed forwards by the tool conveying device, where the swivellable or foldable tool delivery point is located. The swivellable or foldable tool delivery point is always located at the end of the conveying section. According to claim 9, on the other hand, the tool delivery point is constituted as a drawer. The drawer can have a relatively small depth, so that it extends only up to the (front) end of the conveying section of the tool conveying device. In this case, the drawer can be integrated without problem into a door closing the front side of the at least one tool module or of the automated tool dispenser (claim 12). With this design, the tool conveying device advantageously extends over the whole depth (from front to rear) of a tool carrier by means of which the tools are carried. Alternatively, the drawer can extend below the tool conveying device. In this case (claim 26), it is possible either to dispense with a spiral conveyor (or a comparable conveying device), as it is defined in claim 14 (if the tool delivery point extends right to the rear), or to use a shorter conveying device. If the tool is located in the closed position above the tool delivery point constituted as a drawer, it is possible to allow the selected tool simply to drop into the drawer located beneath by releasing a holding mechanism. The drawer can then be operated manually or, as defined in claim 10, by motor. The holding mechanism can be constituted either in the form of a hook or suchlike, to which the tool can be kept suspended, or in the form of a cover of a tool carrier which is constituted as a bottom plate, on which the tool rests and which can be removed by a suitable control pulse, e.g. pushed away under the tool. According to an advantageous embodiment, it is also possible, as it were as a mixed form, to constitute a drawer for example in the form of a rotary table which can be swiveled about a vertical axis.

According to an advantageous embodiment of the present invention, the drawer can be combined with the foldable flap or the swivellable channel. In this case, the tool can be removed by pulling out the drawer if the folding or swiveling mechanism is defective. In the normal case, the tool can be removed by pulling out the drawer or via the flap or channel integrated into the drawer.

Through the features of claim 10, the tool delivery point, for example a swivellable channel (claim 7), a foldable flap (claim 8) or a drawer (claim 9), can be operated by motor for the opening and/or closing. In the case of motor-driven closing, it is advantageous that the worker, after he has removed the tool and therefore possibly does not have his hands free, does not have to be concerned about the closing; this can take place automatically after a preset time, and/or the closing can be triggered by a light barrier or can be carried out by operation of a switch, for example a foot switch. In the case of motor-driven opening, it is advantageous that the tool delivery point is not inadvertently opened prematurely. In particular, this can prevent the tool from falling behind the tool delivery point which is located in its open position, insofar as no other suitable measures are taken to prevent this. Alternatively, the opening of the tool delivery point can be released only when the conveying of the tool with the aid of the tool device has been completed, so that it is ensured that the tool is present in (claim 7) or at (claim 8) the tool delivery point. Furthermore, the software of the automated tool dispenser according to the invention can enable the simultaneous requesting of a plurality of tools which—if certain criteria are satisfied, e.g. the fact that the tools do not fall onto one another—are then delivered jointly, so that the wear on the tool delivery point is reduced as a result of the reduced number of opening/closing procedures.

The features of claim 12 of the present invention enable automated tool dispensers to be equipped in a simple and straightforward manner, all the tool compartments being accessible at the same time from the front side. The free access to the tool compartments and the tool conveying devices, moreover, is advantageous in the event of repairs or maintenance.

As an alternative to the door defined in claim 12, it is also possible to provide a door which covers only an associated tool compartment or selected tool compartments, so that the tool delivery point itself is not integrated into the door, but for example is arranged in the front side of the automated tool dispenser below the latter.

The features defined in claim 13 emphasise the modular concept of the "modular automated tool dispenser" according to the invention, wherein the arrangement of the individual tool delivery modules is in principle not predetermined or limited. On the contrary, the tool delivery modules can be arranged arbitrarily and can thus be joined together to form a unit—referred to above as a "delivery part"—according to preferred criteria. If, for example, the weight does not have the relevance highlighted above as one of the tool parameters, i.e. the automated tool dispenser contains for example only lightweight parts, the arrangement of the modules can take place according to different standpoints.

According to the features of claim 14, the tools can be conveyed on a tool carrier by means of a spiral conveyor and a rotary drive in the direction of the tool delivery point, the tool carrier, spiral conveyor and rotary drive being elements of the tool conveying device. As is defined in claim 1, a specific tool class is associated with each tool conveying device thus constituted, or in other words: Through the design of the tool conveying device according to claim 13, i.e. amongst other things the fixing of the pitch and the diameter of the spirals and their position relative to the tool carrier, an optimum adaptation to the tools of the tool class associated with the tool conveying device is made possible. The use of suitable transport means (component slider) extends the possibilities for the structural design and layout. Thus, it is not necessary for the conveying of the tool that the latter is directly “gripped” by the spiral conveyor. For example, there can be arranged normal to the longitudinal direction of the spiral conveyor transport rods or suchlike which are carried along by the spiral conveyor and for their part carry along the tool, which can thus also be smaller than the diameter of the spiral conveyor. As a result of the fact that the size of the spiral conveyor does not necessarily have to correspond to the size of the tool to be conveyed, there is a simplification of the automated tool dispenser according to the invention, to the effect that spiral conveyors of the same size can be used in a wide range of tool sizes. The tool carrier can also be constituted by a plurality of parts, which support the tool at suitable points and in a suitable position.

The tool carriers are advantageously constituted according to claim 15, i.e. rectilinear. It follows from this that the spiral conveyor is advantageously likewise constituted or arranged rectilinear and parallel to the tool carrier. This permits a compact design and, particularly in the case of an embodiment of the tool compartment in the form of a drawer, is advantageous when loading the automated tool dispenser. The relative arrangement of the spiral conveyor, tool carrier and any transport means according to claims 15 to 19 can advantageously be adapted to the given tool parameters.

Through the features of claim 21, a change in the loading of the automated tool dispenser according to the invention presents no problems, for example due to a changed or frequently changing product range. In particular, a company acquiring and setting up the automated tool dispenser according to the invention is not committed to specific dimensioning, such that other tools would require other tool compartments etc.

Through the features of claim 22 and 24, the operation of the automated tool dispenser becomes user-friendly, the feedback of the data provided with the aid of the tool selection device advantageously being able to be corrected, so that an incorrect tool delivery, due for example to transposed numbers, is for the most part avoided.

According to a further aspect of the present invention, a method for delivering tools with the aid of the automated tool dispenser according to any one of claims 1 to 24 comprises the following steps: selection of a tool and inputting of the number of tools to be delivered by operation of the tool selection device; activation of the given tool conveying device by means of the tool selection device; the opening of the tool delivery point; and closing of the tool delivery point after removal of the tool.

The above and further problems, properties and advantages of the present invention can be seen more clearly from the following detailed description, which has been produced by reference to the appended drawings. In the drawings.

Figure 1:
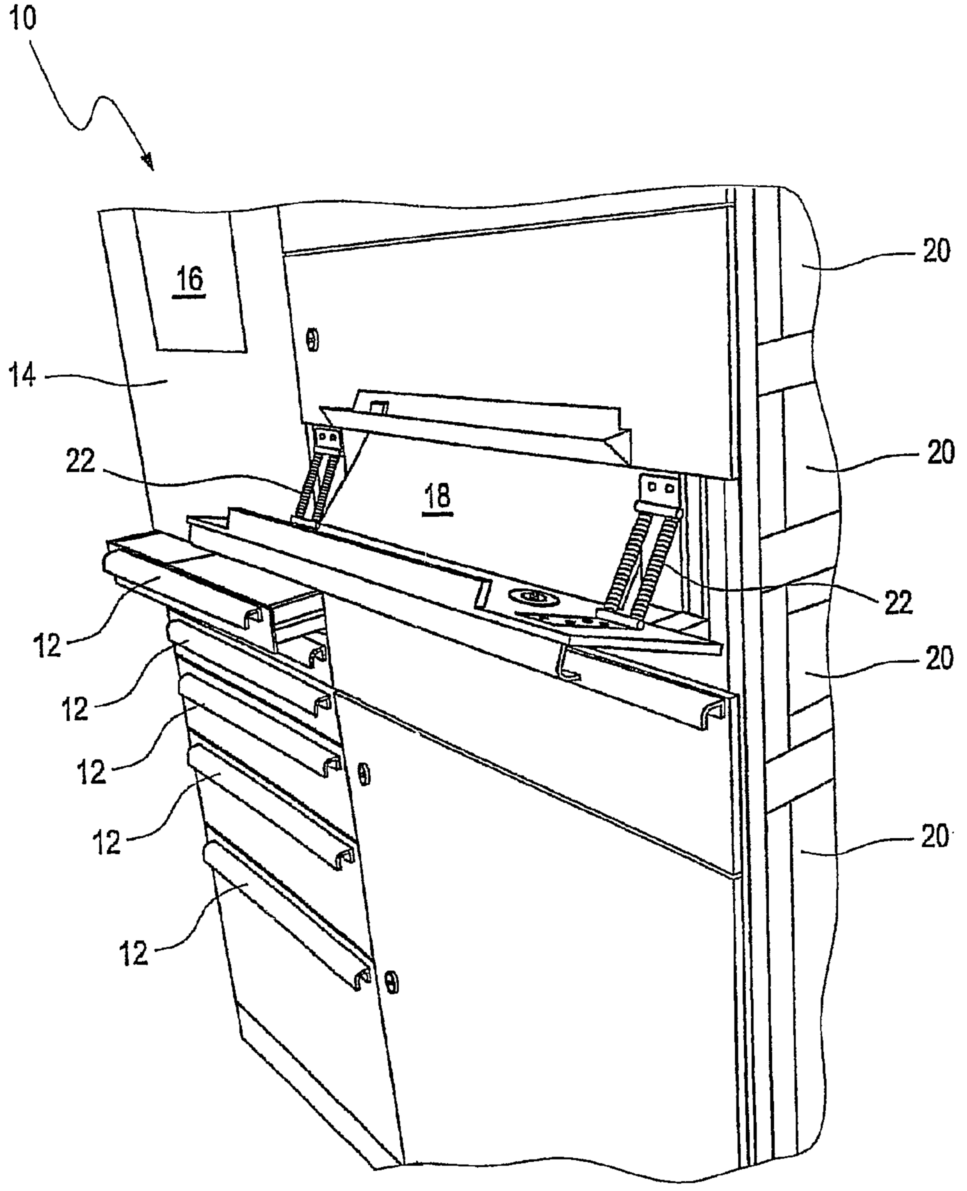
FIG. 1 shows an overall oblique view from the front of an exemplary embodiment of a modular automated tool dispenser according to the present invention.

FIG. 1 shows an overall oblique view from the front of an exemplary embodiment of a modular automated tool dispenser 10 according to the present invention. As is shown in FIG. 1, automated tool dispenser 10 comprises a plurality of drawer-like tool delivery points 12 with ergonomic strip-like gripping handles, a tool selection device 14 with a display 16 and a plurality of swivellable tool delivery points 18, which are each constituted in the form of an essentially horizontal channel. The cover on the right-hand side of automated tool dispenser 10 is removed in FIG. 1, so that it is possible to see tool compartments 20 which extend from the front side of automated tool dispenser 10 to the rear and which are each connected to one of swivellable tool delivery points 18. As is shown in FIG. 1, the size of drawer-like tool delivery points 12 and the size of swivellable tool delivery points 18 differ; they can be selected according to requirements. In particular, the assembly of the modules shown in FIG. 1 is only by way of example. Furthermore, as is shown in FIG. 1 by strip-like griping handles and a spring mechanism 22 of swivellable tool delivery points 18, the actuation takes place manually according to this embodiment. Alternatively, an (electric) motor-operated mechanism can be provided. According to the embodiment, the selection and the inputting takes place via display 16 constituted as a touch-screen. The inputting can however also take place by means of a keyboard or suchlike.

Figure 2:
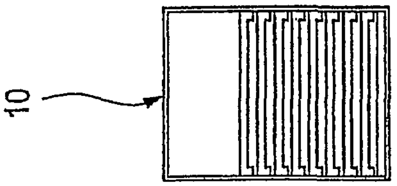
FIG. 2 shows a front view of an exemplary embodiment of a modular automated tool dispenser according to the present invention.

FIG. 2 shows a front view of a further exemplary embodiment of a modular automated tool dispenser 10 according to the present invention. Automated tool dispenser 10 comprises a plurality of flaps extending over its whole width in a front door 37, said flaps being able to be operated manually or motor-driven.

Figure 3:
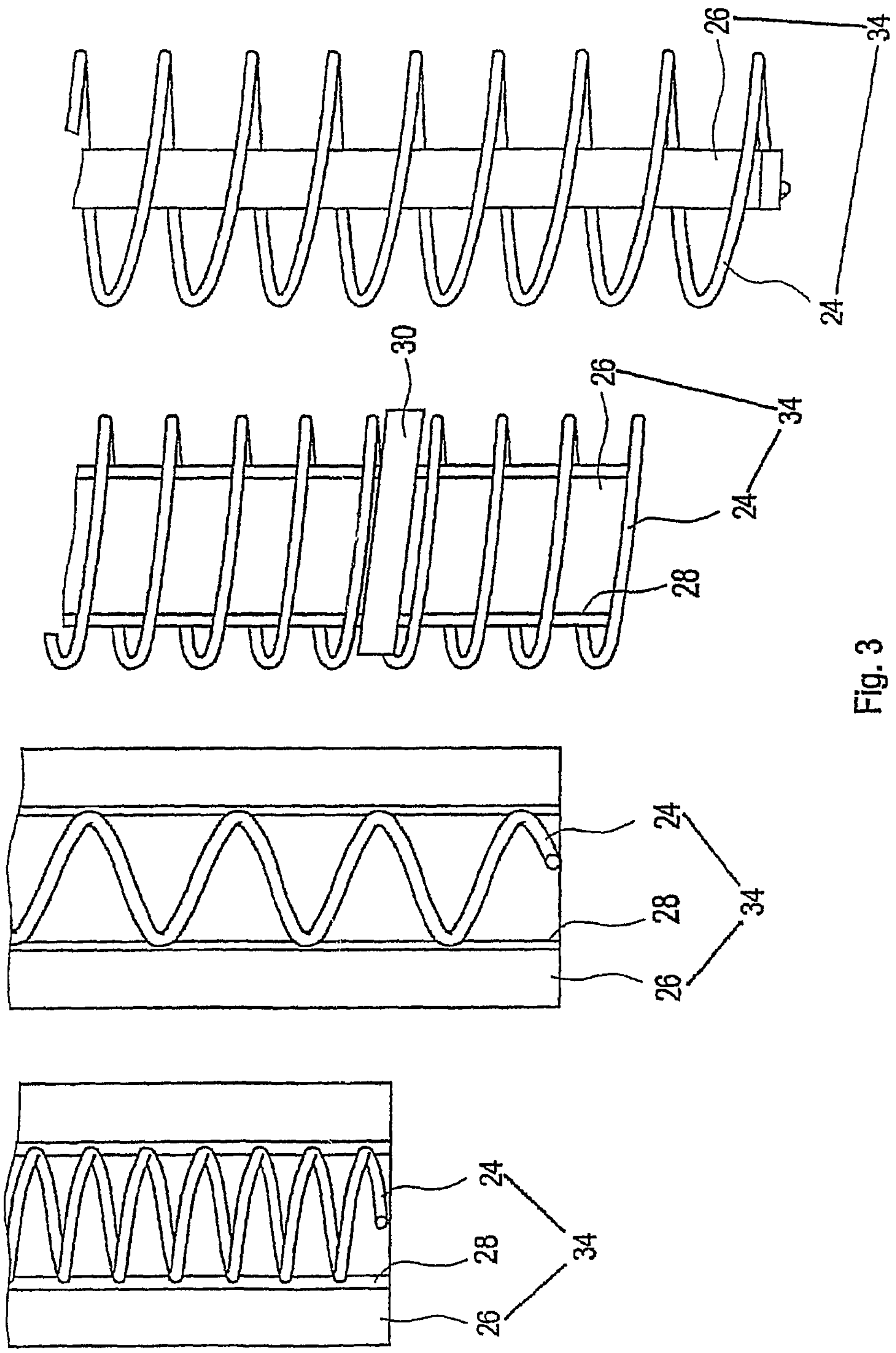
FIGS. 3 and 4 show exemplary spiral conveyors and tool carriers of the modular automated tool dispenser according to the present invention.
Figure 4:
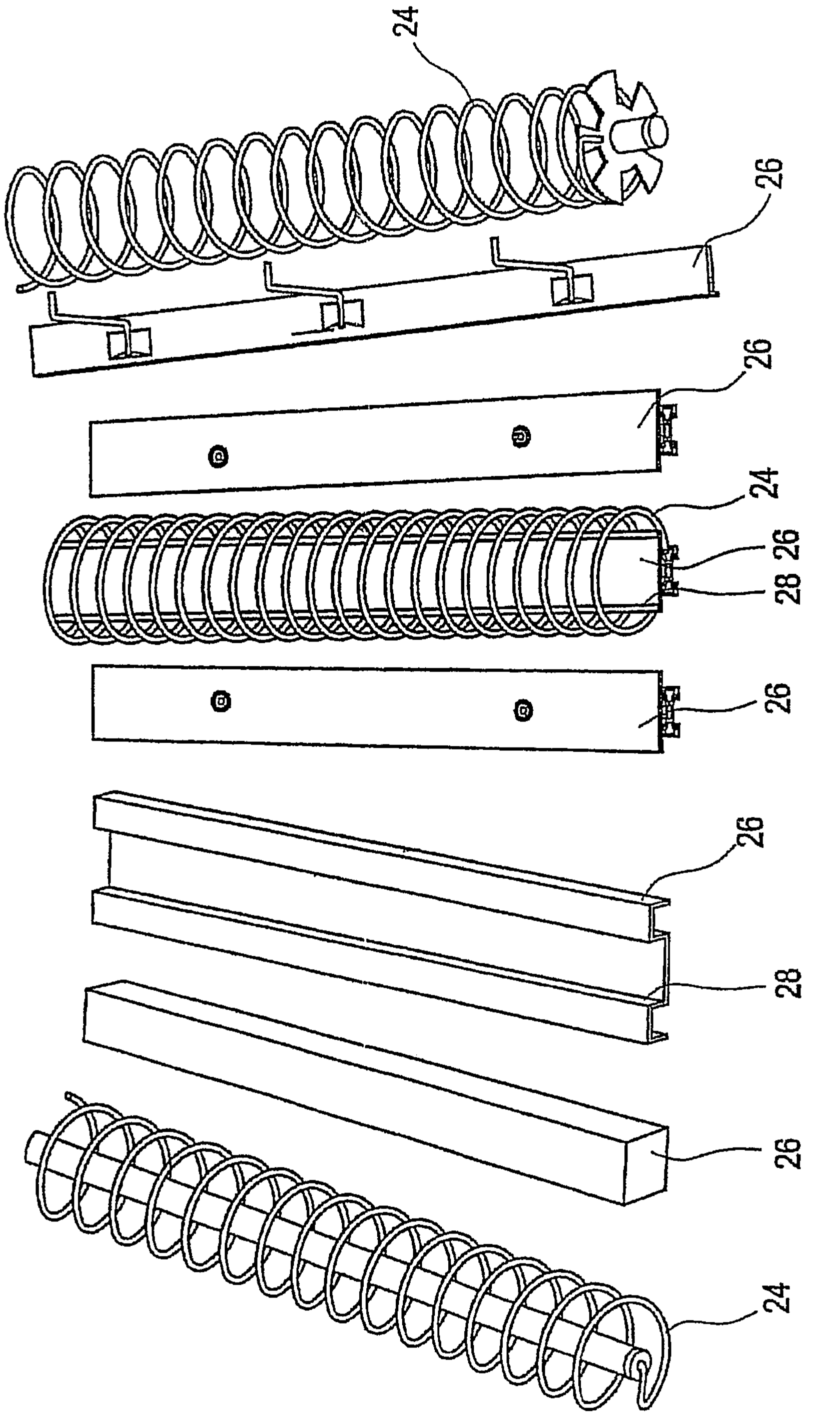

FIGS. 3 and 4 show various embodiments of spiral conveyors 24 and tool carriers 26, wherein in FIG. 4 in particular the various cross-sections of tool carriers 26 constituted as generally rod-shaped profile elements are shown; the cross-sections are constituted for example rectangular or round or in the shape of a double-T carrier, so that a kind of channel 28 is formed by corresponding elevations of the longitudinal sides with respect to the central part of tool carriers 26. Channel 28 serves to accommodate spiral conveyor 24 and/or the tool. Spiral conveyors 24 can be dimensioned such that they experience a lateral fixing by means of channel 28, as is shown for example in FIG. 3 in the two left-hand embodiments, or they can be dimensioned such that they surround tool carrier 26, as is shown for example in FIG. 3 in the two right-hand embodiments. The embodiments shown in FIGS. 3 and 4 are only by way of example; any cross-sectional shape of tool carrier 26 can in principle be used, it being governed by the size and shape of the tool to be conveyed. As is shown in FIG. 3, the pitches of spiral conveyors 24 are also different. The pitches are also governed by the workpiece to be conveyed and by the manner in which the workpiece is gripped by spiral conveyor 24. A tool delivery device 34 according to the invention comprises a combination of a suitable spiral conveyor 24—or another, not spirally constituted conveying means—and a suitable tool carrier 26, which however are preferably not necessarily constituted rectilinear and arranged parallel to one another. As is shown in FIG. 3, for the conveying of small tools, i.e. tools which, lying or standing or hanging on tool carrier 26, are not gripped by spiral conveyor 24 and carried along, use may be made of a component or tool slider 30 (referred to in short below as "component slider 30"), which is supported for example by tool carrier 26 and engages with spiral conveyor 24. Component slider 30 is moved by rotating spiral conveyor 24 from the latter in the direction of a tool delivery point and slides a tool or a tool unit along with it. Tool carriers 26 with a round cross-section, such as is shown for example in the right-hand embodiment of FIG. 3 and in the left-hand embodiment of FIG. 4, are particularly advantageous when the tool or the tool unit can be transported "threaded-on" or suspended, as may be the case for example with grinding wheels.

Figure 5:
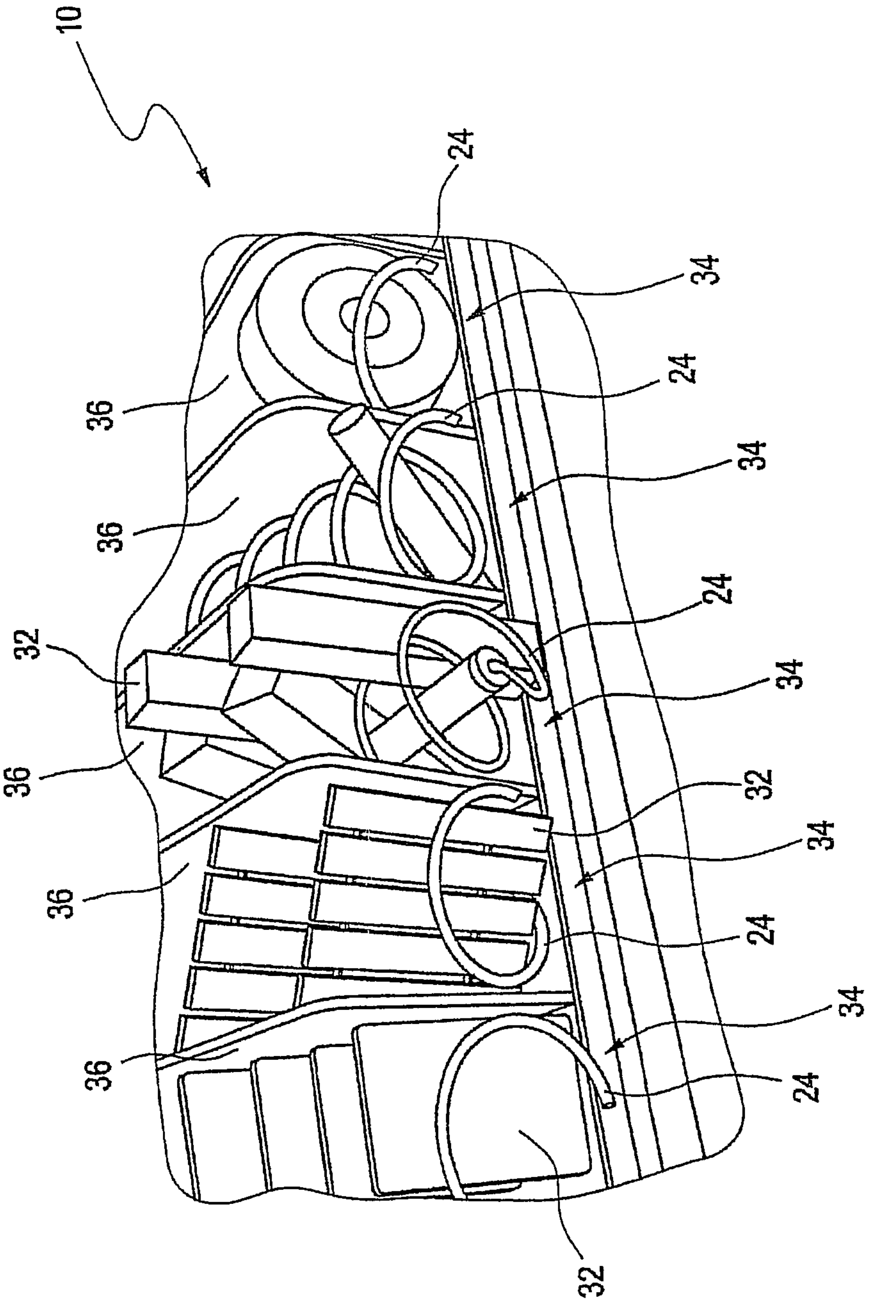
FIGS. 5 and 6 show exemplary loading of tool conveying devices of the modular automated tool dispenser according to the present invention.
Figure 6:
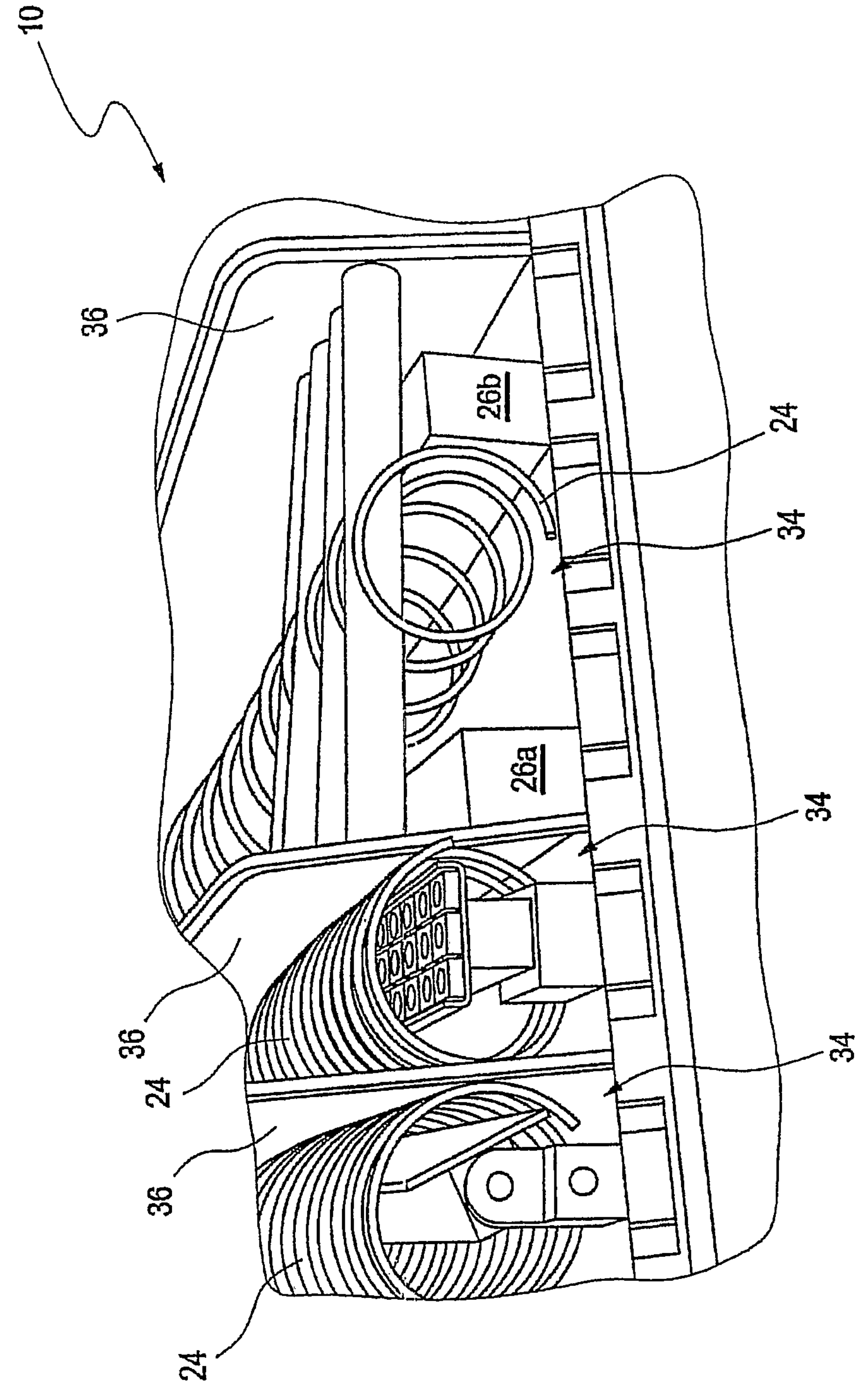

FIGS. 5 and 6 show exemplary loading of tool conveying devices 34. As is shown in FIG. 5, tools can be conveyed by spiral conveyor 24 in the form of packages, boxes or suchlike as tool units 32 according to the invention, so that it is not a single tool, but a predetermined number of identical tools that are delivered by a single selection by a worker. A "threaded-on" grinding wheel is shown on the far right in FIG. 5. As is shown in FIG. 6, the width of tool conveying devices 34, which here are demarcated from one another by partition walls 36, is very different and is adapted to the tool to be conveyed. In particular, it can clearly be seen in FIG. 6 that tools with very different dimensions can be conveyed by spiral conveyors 24 having approximately the same diameter. Thus, according to the tool selection shown in FIG. 6, the tool is either present inside spiral conveyor 24 (in the case of the two left-hand tool conveying devices 34) or it projects on both sides well beyond spiral conveyor 24. Especially in the latter case (right-hand tool conveying device 34 in FIG. 6), tool carrier 26 is formed by a first carrier part 26*a* and a second carrier part 26*b*, on which the tools essentially lie in the horizontal direction, and spiral conveyor 24 is arranged in this embodiment between the two carrier parts 26*a*, 26*b*.

Figure 7A:
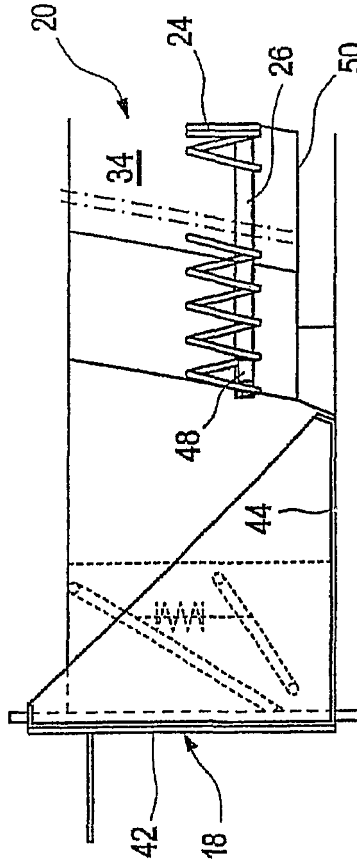
FIGS. 7A and 7B show schematic side views of two variants of a tool compartment of a modular automated tool dispenser according to an exemplary embodiment of the present invention.
Figure 7B:
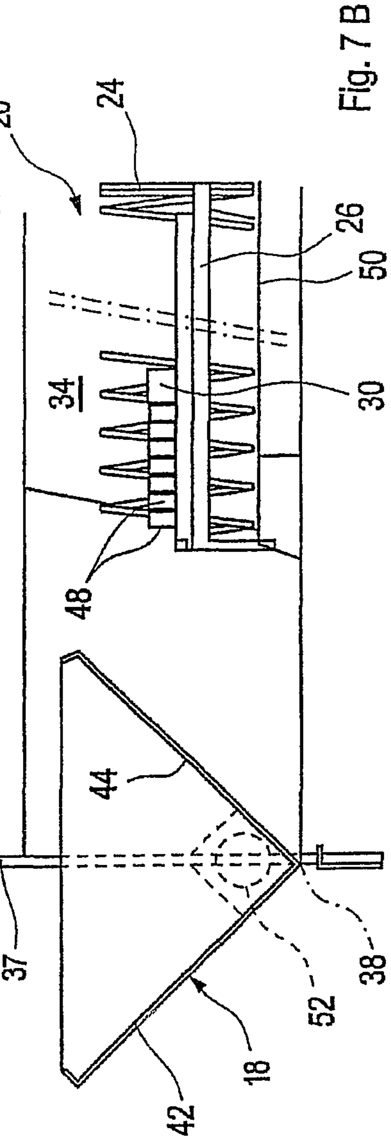
Figure 7C:
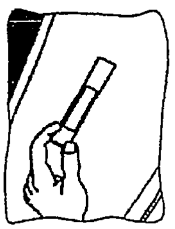
FIG. 7C shows the removal of a tool from the tool delivery point by a worker.

FIG. 7 shows a schematic side view of two variants of a tool compartment, in particular a tool conveying device 34, of modular automated tool dispenser 10 shown in FIG. 2. Automated tool dispenser 10 comprises front door 37, in which channels 18, as tool delivery points according to the invention, are arranged so as to be swivellable about a lower, horizontal axis 38. Channels 18 comprise a front cover 42 and a tool collection part 44, which are connected to one another essentially at right angles, and can be closed and opened either manually by means of a handle running vertically or horizontally in each front cover 42, as is shown in FIG. 7A, or motor-driven by means of a suitable servomotor 52, as is shown in FIG. 7B. The two variants of FIGS. 7A and 7B also differ in the size of represented spiral conveyors 24 in relation to a tool 48 to be conveyed. As is shown in FIG. 7A, tool collection part 44 forms, in the closed state of channel 18, as it were a continuation of the bottom of a tool compartment 20, in which tool conveying devices 34 are accommodated. By rotation of spiral conveyor 24, tools 48 are conveyed to the left in the figure and fall onto tool collection part 44. Channel 18 is then swiveled about axis 38, either manually operated (FIG. 7A) or automatically (FIG. 7B) with the aid of servomotor 52, so that it reaches the position represented in FIG. 7B and the tool can easily be removed from the exterior (see FIG. 7C). In order to move tool in the direction of channel 18, component slider 30 (see FIG. 7B) is used as a transport means, which engages with spiral conveyor 24. The angle between front cover 42 and tool collection part 44 does not have to amount essentially to 90°, as represented in FIG. 7; it can for example also be less than 90°. In this case, tool collection part 44 would be inclined with respect to spiral conveyor 24 when channel 18 is closed, so that the drop height and the hardness of the impact of tool 48 would be advantageously reduced. As is shown in FIGS. 7A and 7B, spiral conveyor 24 is supported by a spiral carrier 50.

Figures 8A, 8B, 8C, 8D:
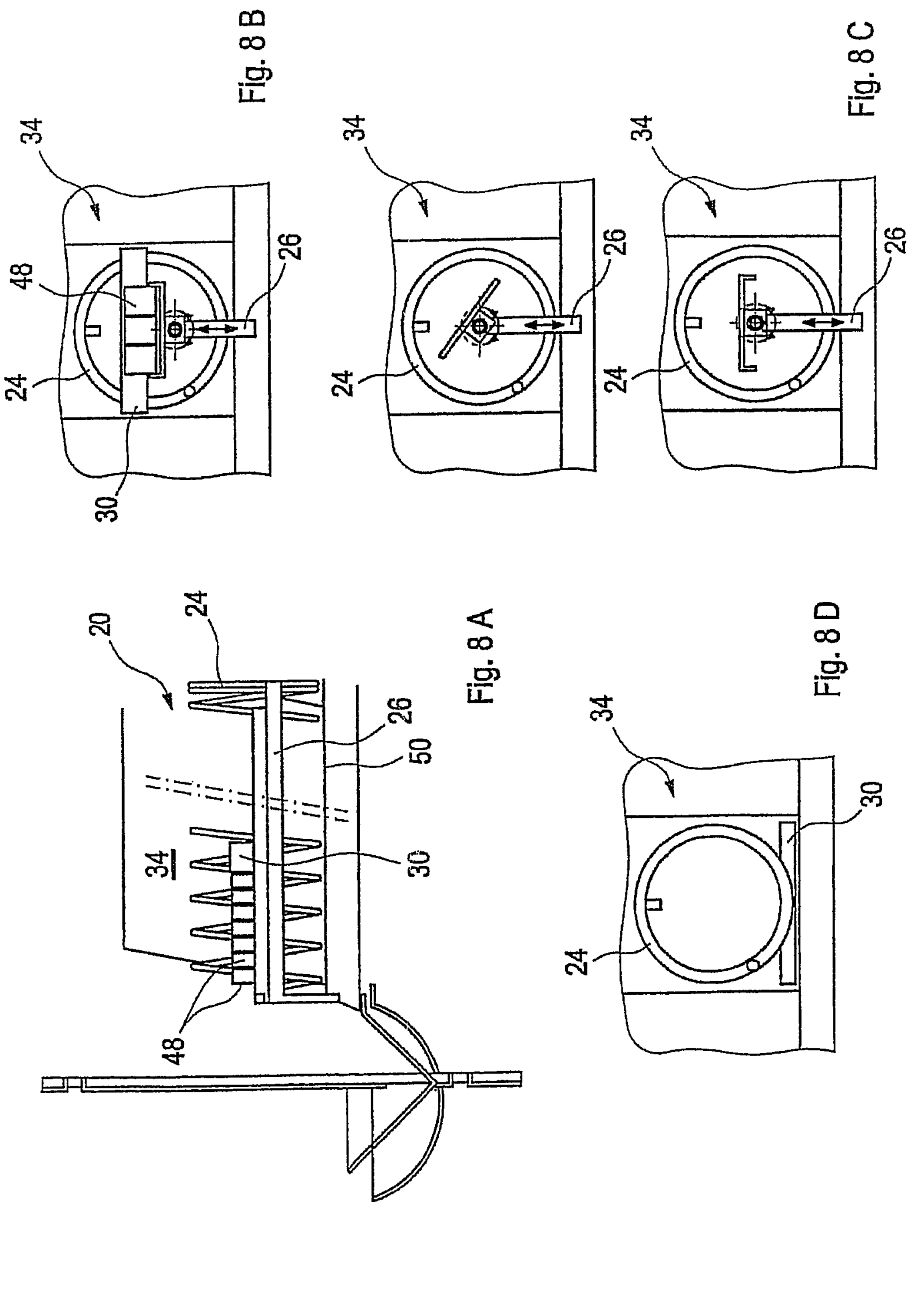
FIG. 8A to 8D show schematic side and front views of a tool compartment of a modular automated tool dispenser according to an exemplary embodiment of the present invention.

FIG. 8A shows a view equivalent to FIG. 7B. FIG. 8B shows a plan view, i.e. a view from the left in FIG. 8A onto the arrangement comprising spiral conveyor 24 and component slider 30, wherein the engagement of component slider 30 into spiral conveyor 24 surrounding the workpiece or workpieces 48 can clearly be seen. Furthermore, tool carrier 26, as is shown by arrows in FIG. 8A and FIG. 8C, is both height-adjustable and swivellable and is therefore displaceable in its spatial relationship with spiral conveyor 24. By pushing tool 48 by means of displaceable tool carrier 26 out of the central position with respect to spiral conveyor 24, a tool 48 which would not be gripped centrally by spiral conveyor 24 can be engaged by the latter, so that in such a case component slider 30 can be dispensed with. As is shown in FIG. 8D, component slider 30 can be arranged, instead of on tool carrier 26, also directly on the bottom of tool conveying device 34.

Figure 9:
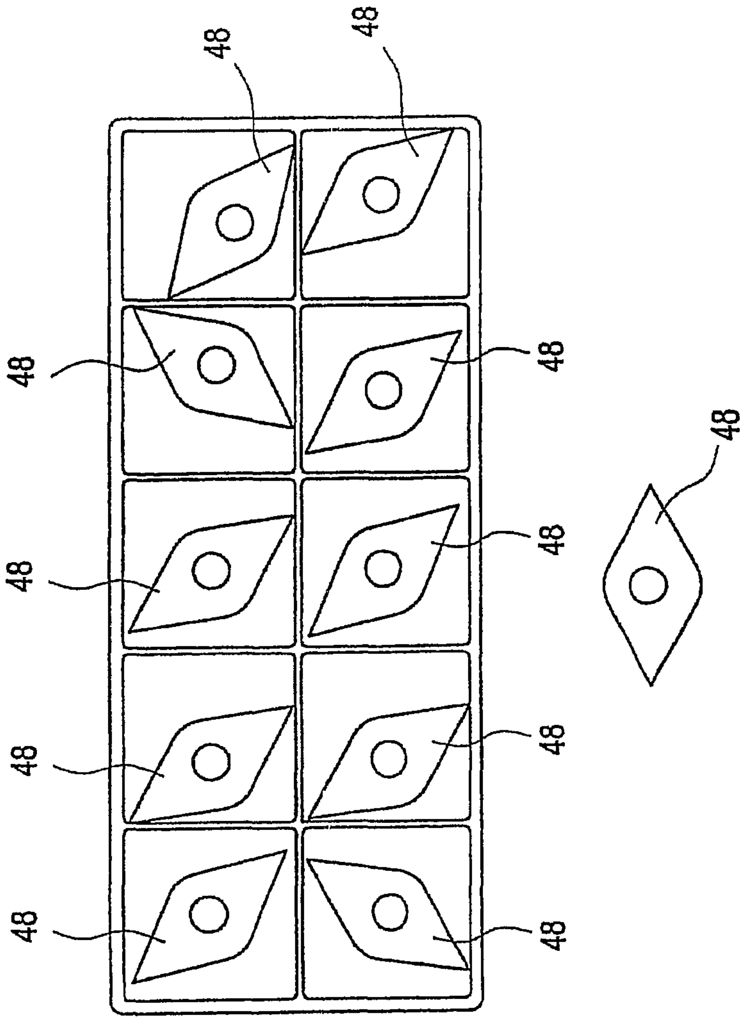
FIG. 9 shows an exemplary tool unit according to the present invention beside an individual workpiece of the same type.
Figure 10:
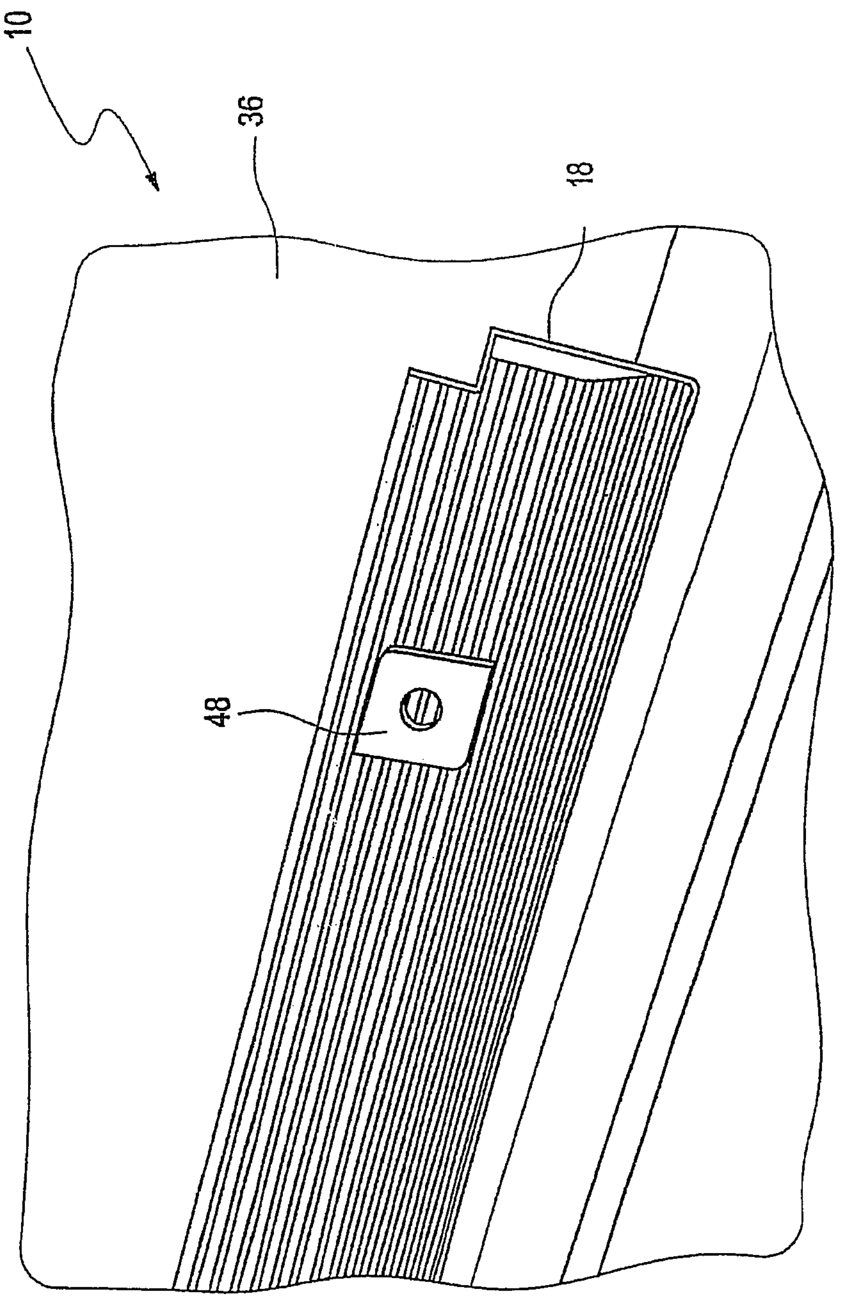
FIGS. 10 to 16 show an exemplary tool delivery point of the modular automated tool dispenser according to the present invention.
Figure 11:
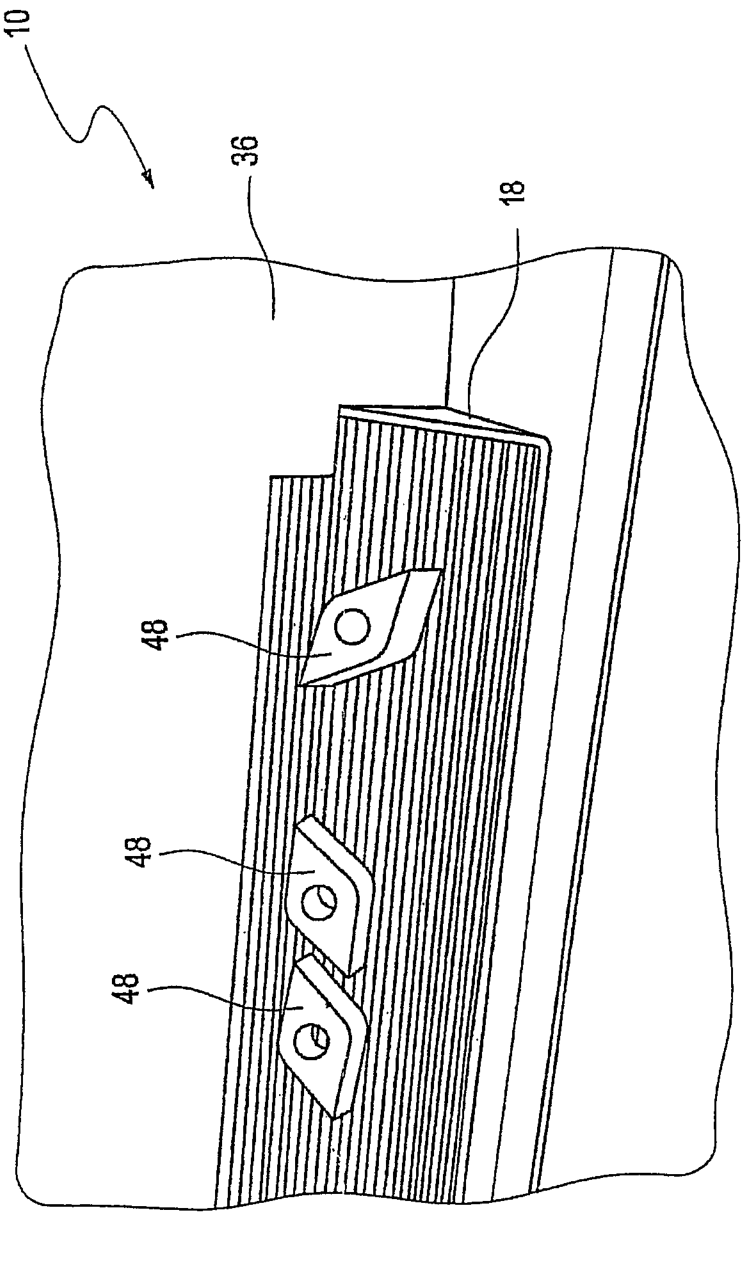
Figure 12:
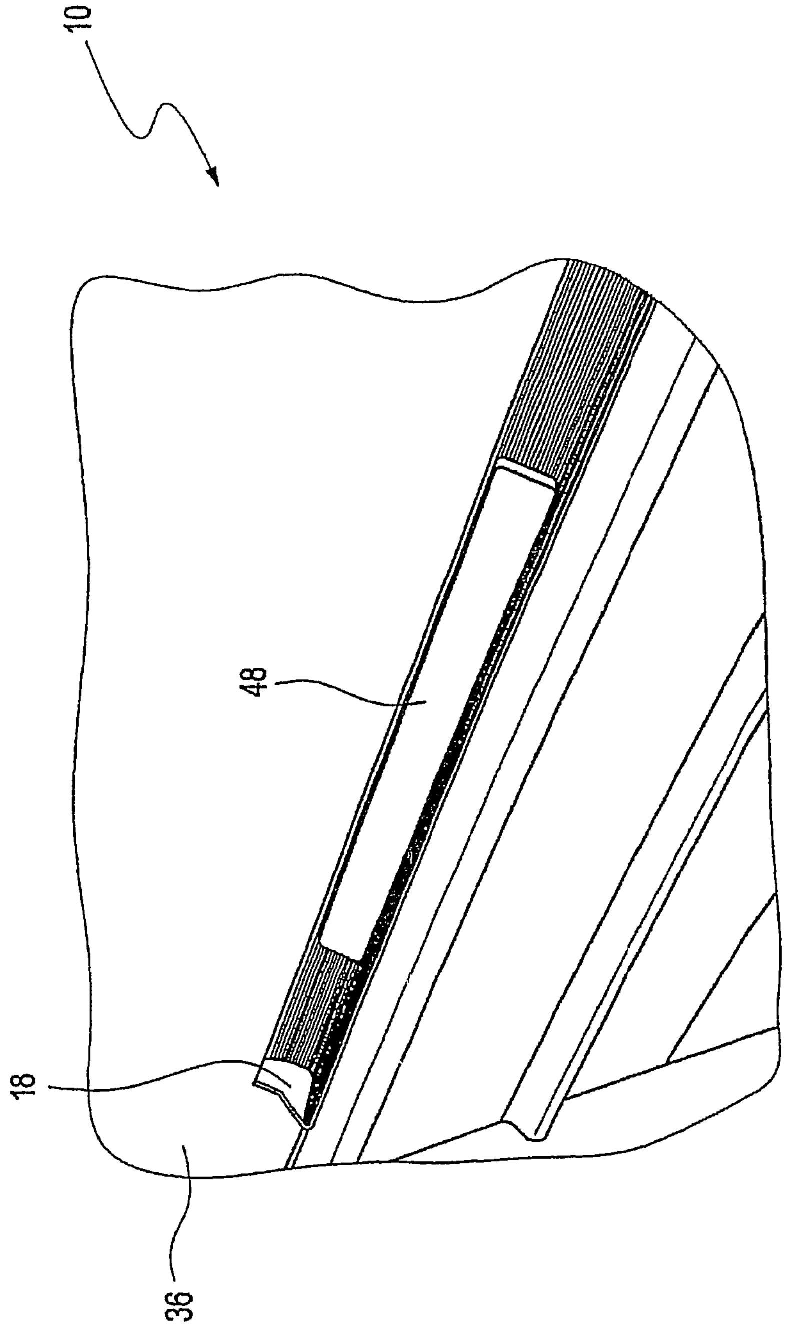
Figure 13:
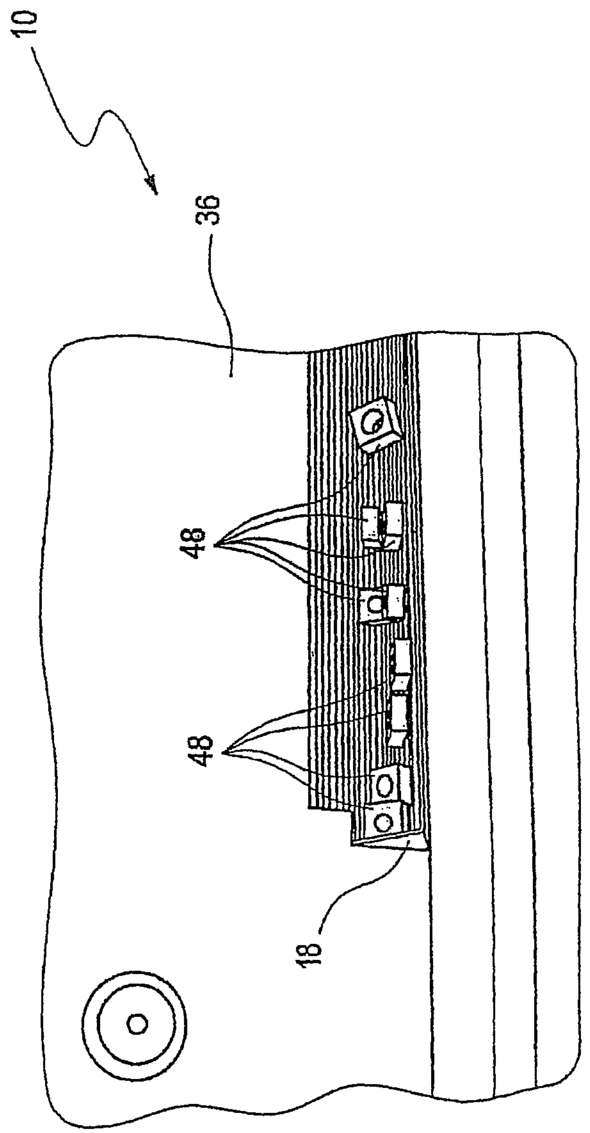
Figure 14:
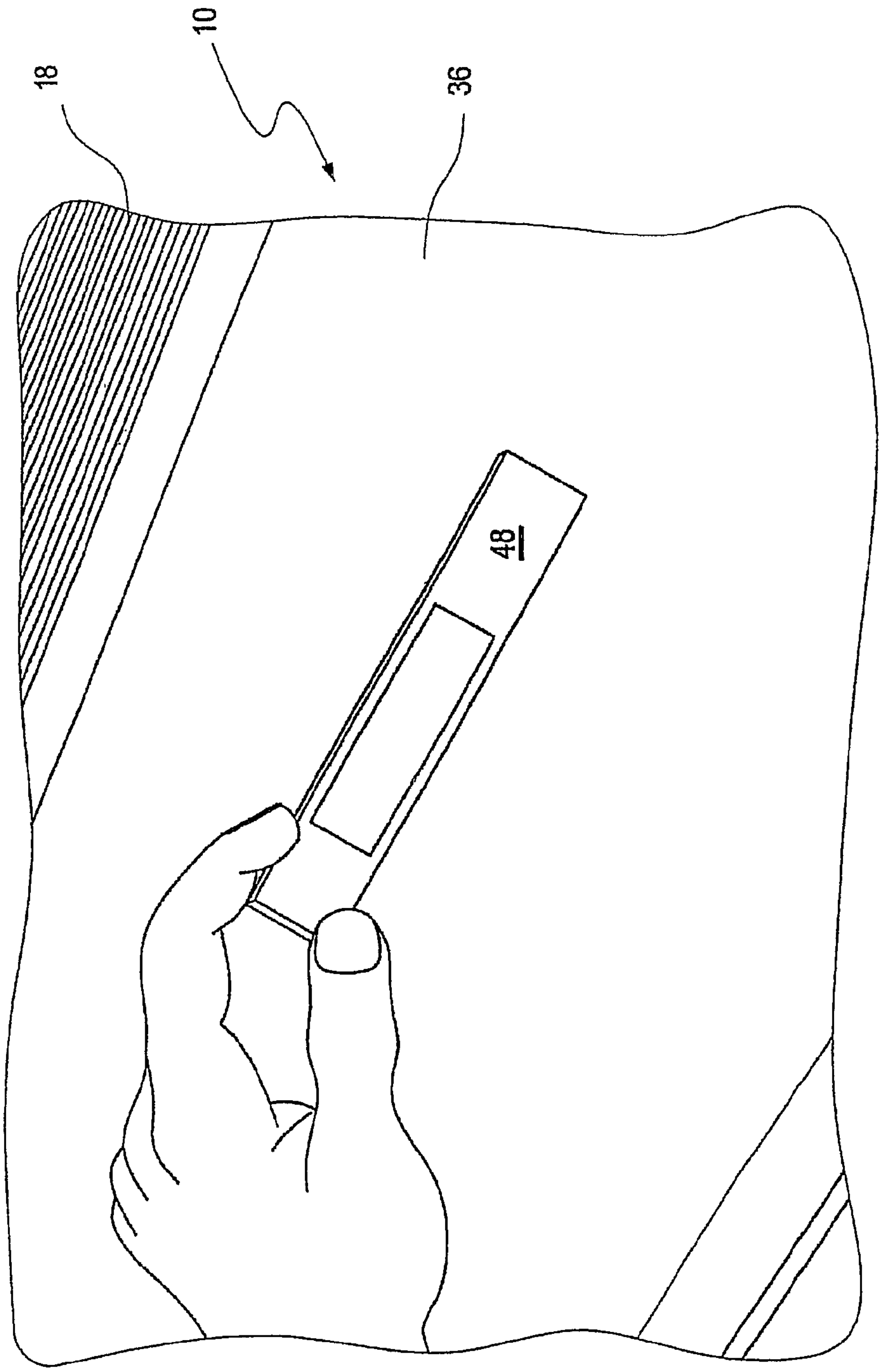
Figure 15:
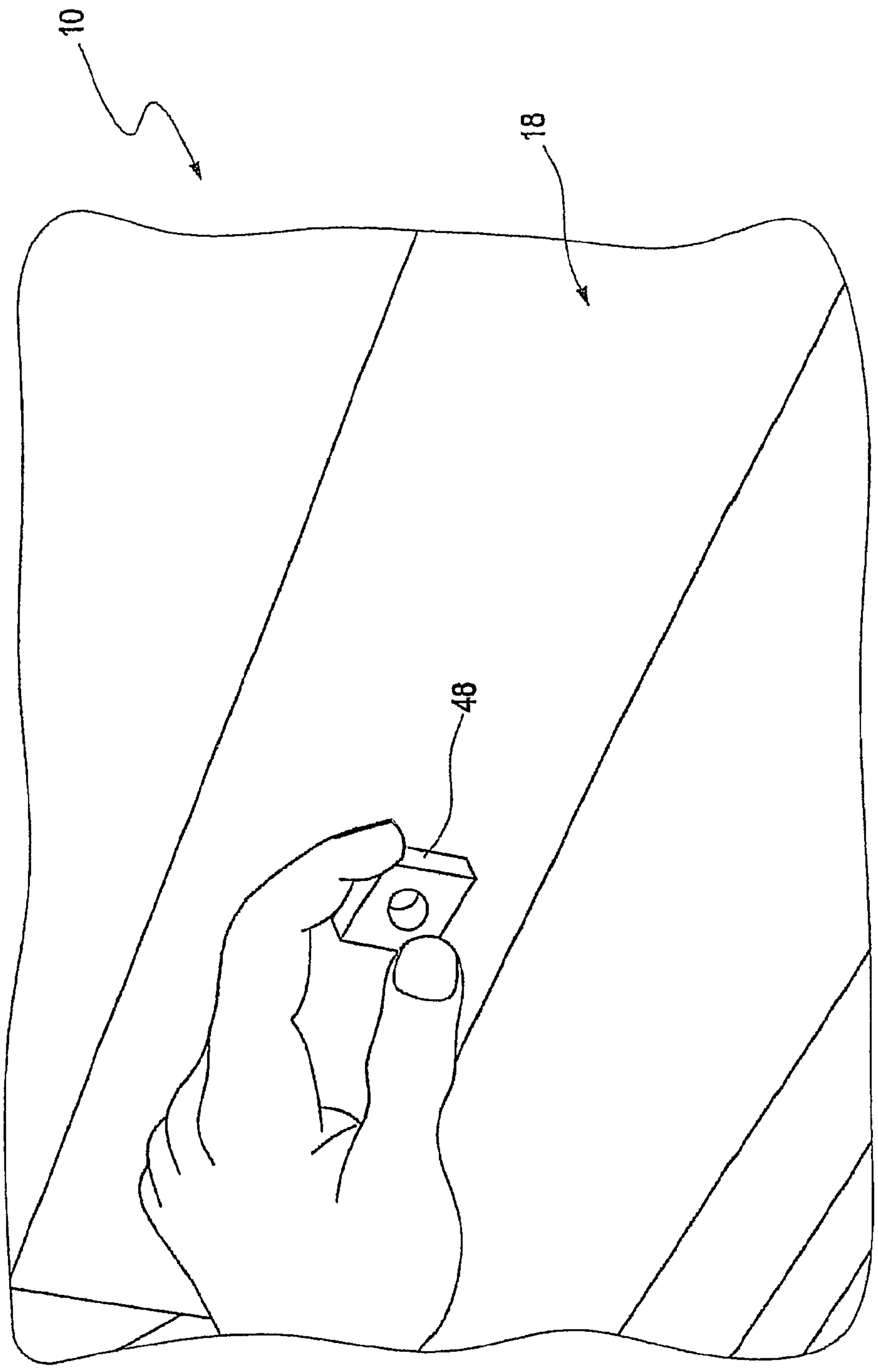
Figure 16:
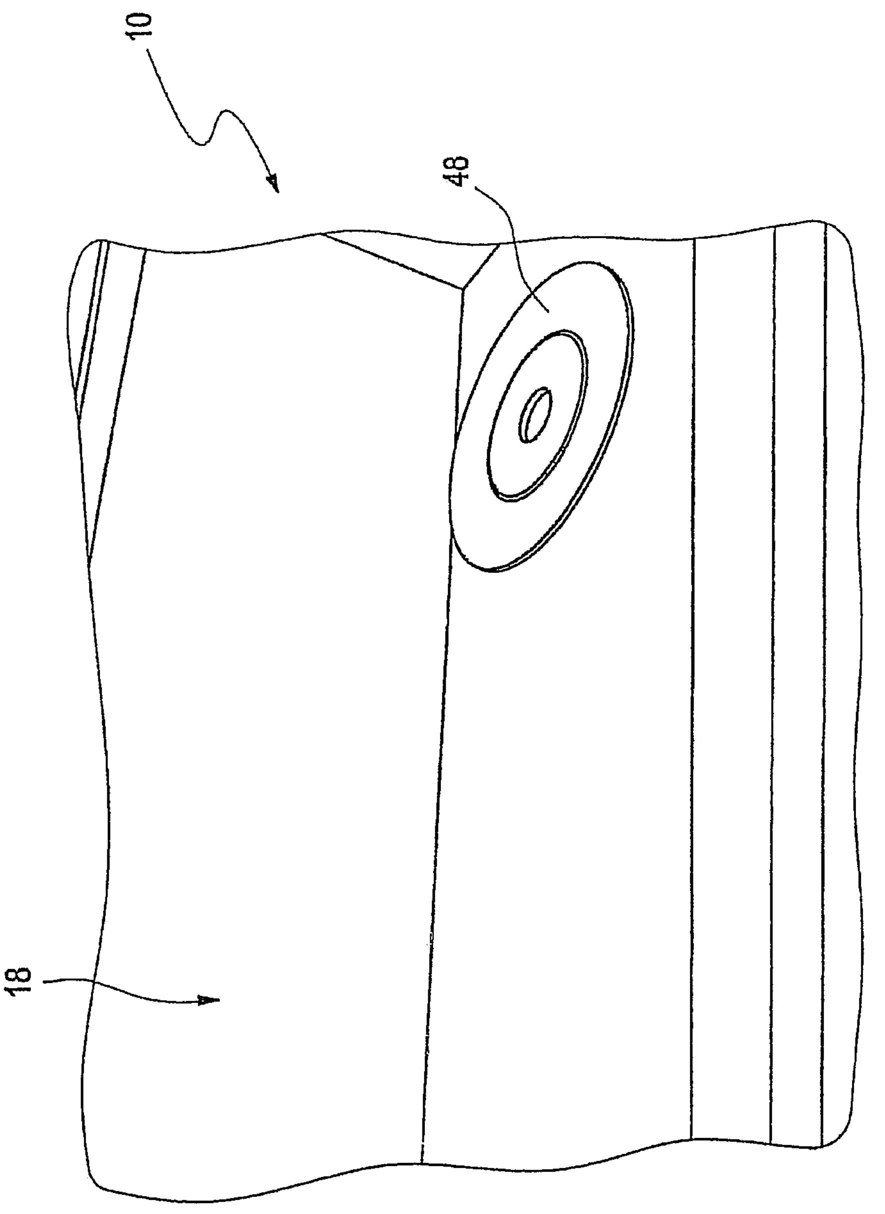

FIG. 9 shows an exemplary tool unit according to the present invention together with an individual workpiece of the same type. According to the present invention, both delivery variants are conceivable, it being advantageous to deliver smaller tools in the form of tool units comprising a plurality of identical tools.

FIGS. 10 to 16 show various exemplary tool delivery points of the modular automated tool dispenser according to the present invention. It can clearly be seen that tools of the most valid shape and size can be delivered by automated tool dispenser 10 according to the invention.

Figure 17:
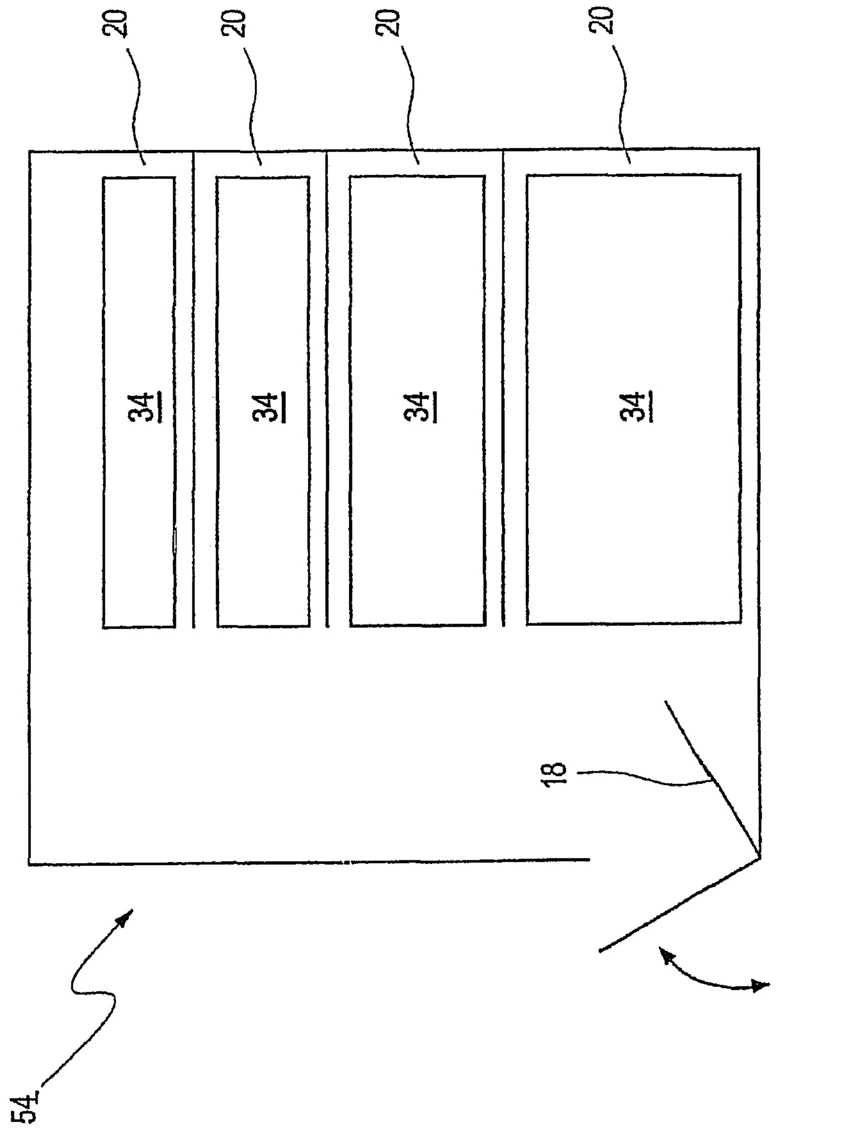
FIG. 17 shows a schematic side view of a tool module according to an embodiment of the present invention, wherein a single tool delivery point is associated with a plurality of tool compartments.

FIG. 17 shows very schematically a tool module 54 in a side view, with four tool compartments 20, in which a tool conveying device 34 is arranged in each case, the latter comprising a tool carrier (not shown) and conveying means such as for example spiral conveyor 24 (not shown) described above, it being indicated that, as a result of the differing height of tool compartments 20 and tool conveying devices 34, the largest or heaviest tools are stowed in lowest tool compartment 20 and the smallest or lightest tools are stowed in uppermost tool compartment 20. The tools of all tool compartments 20, or more precisely of tool conveying devices 34 accommodated therein, fall onto the same swivellable tool delivery point 18, which is constituted in the form of an angular channel.

Figure 18:
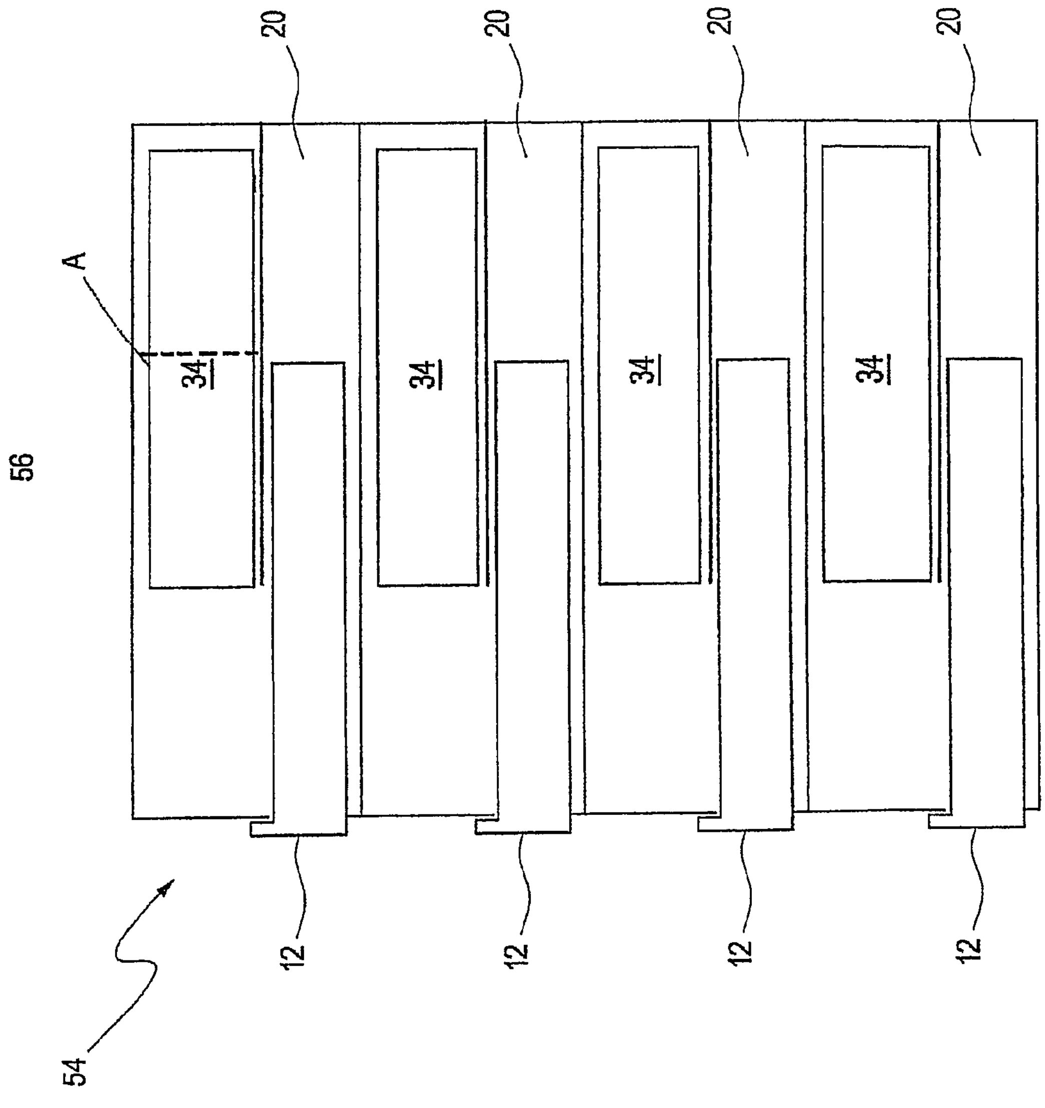
FIG. 18 shows a schematic side view of a tool module according to an embodiment of the present invention, wherein a tool delivery point is associated with each tool compartment.

FIG. 18 shows very schematically a tool module 54 in a side view, with four tool compartments 20, in which a tool conveying device 34 is arranged in each case, the latter comprising a tool carrier (not shown) and conveying means such as for example spiral conveyor 24 (not shown) described above of essentially identical length. Although tool compartments 20 all have the same height here, they can of course be different, as is shown in FIG. 17. As is shown in FIG. 18, individual tool delivery points 12 of tool compartments 20 are constituted drawer-like and are arranged below respective tool conveying device 34. Furthermore, tool delivery points 12 in their closed position do not extend up to the end of respective tool compartment 20, so that an overlapping region 56 is formed.

Alternatively, the tool carrier (not shown) of tool conveying device 34 can extend right from the rear (on the right in FIG. 18) only up to somewhat over the beginning of the overlapping region, i.e. up to a point A, which is shown by a dashed line in FIG. 18. For tools which, in the closed position of tool delivery point 12, are located directly over the latter, a spiral conveyor 24 is then not necessary. Here, it is sufficient to release, by means of a control pulse, a respective holding mechanism (not shown) holding the corresponding tool, so that the selected tool falls into the drawer. The control pulse can be generated by the user, for example by inputting an identification number on a control panel of the automated tool dispenser. Spiral conveyor 24 in this case extends only from the rear up to point A.

Alternatively, the drawer, as has already been mentioned above, can extend only up to the tool conveying device, so that the rear end of the drawer is located roughly in the same vertical plane as the front end of the tool conveying device.

Figure 19:
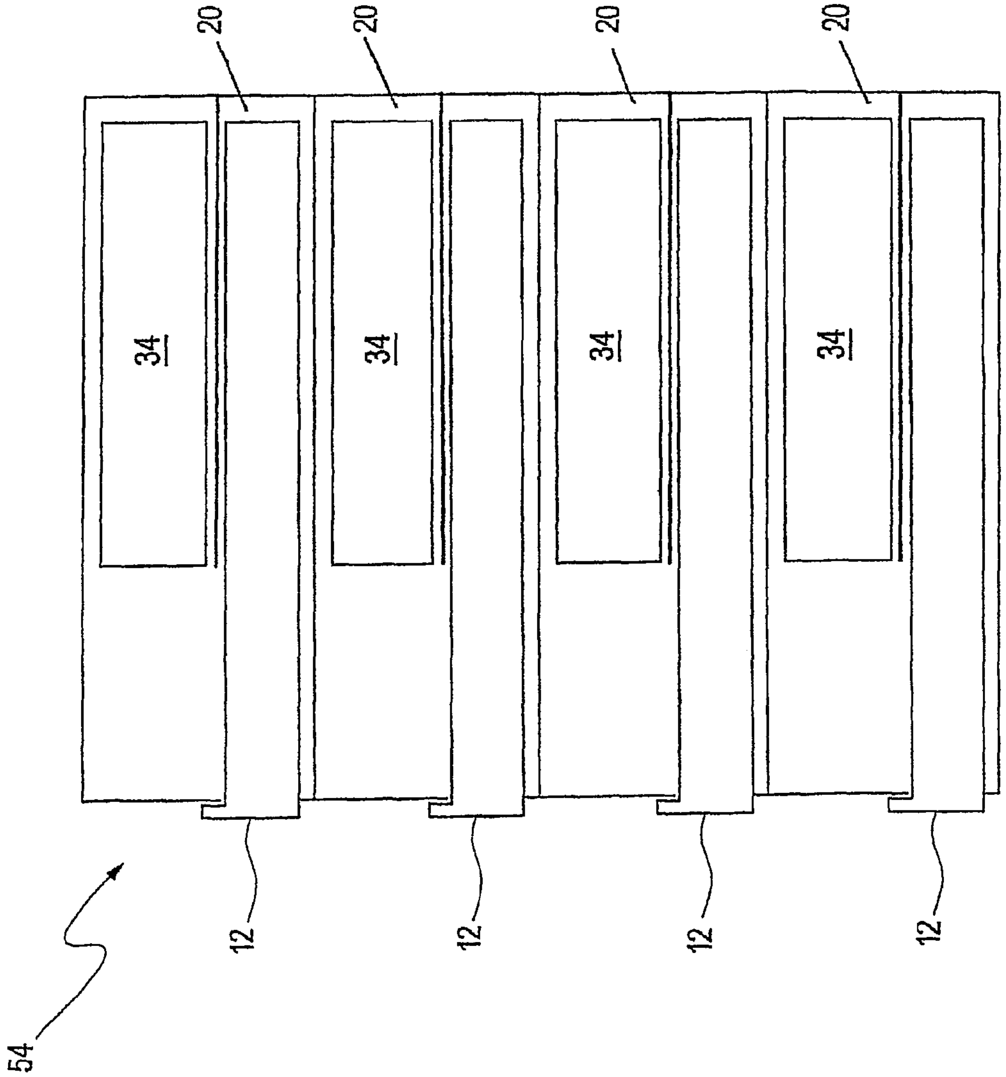
FIG. 19 shows a schematic side view of a tool module according to an embodiment of the present invention, wherein a tool delivery point is associated with each tool compartment.

FIG. 19 shows very schematically a tool module 54 in a side view, which differs from that in FIG. 18 only in that tool delivery point 12 extends right up to the back (right-hand side in FIG. 19).

Although the present invention has been disclosed in respect of preferred embodiments in order to enable a better understanding thereof, it should be noted that the invention can be implemented in different ways without departing from the scope of the invention. The invention should therefore be understood to the effect that it contains all the possible embodiments and developments in respect of the shown embodiments that are capable of being implemented without departing from the scope of the invention, such as is set out in the appended claims.

LIST OF REFERENCE NUMBERS

10 modular automated tool dispenser
12 tool delivery point (drawer-like)
14 tool selection device
16 display
18 tool delivery point (swivellable)
20 tool compartment
22 spring mechanism
24 spiral conveyor
26 tool carrier
26*a* carrier part of 26
26*b* carrier part of 26
28 channel of 26
30 component or tool slider
32 tool unit
34 tool conveying device=24+26
36 partition walls
37 front door
38 horizontal axis
42 front cover
44 tool collection part
48 workpiece
50 spiral carrier
52 servomotor
54 tool module
56 overlapping region

The invention claimed is:

1. A modular automated tool dispenser comprising:

at least one tool delivery module comprising a plurality of tool storage compartments, in which a plurality of tools that are in tool classes are arranged, and at least one tool conveying device, each tool conveying device configured to convey tools of one class from a tool storage compartment to a tool delivery point, at least a plurality of the plurality of tool storage compartments each assigned a unique tool delivery point, the tool classes each defined by the tool type, the tool size and/or the tool weight as tool parameters; and a tool selection device for selecting the desired tool class and number of tools to be delivered and for activating the tool conveying device that is associated with the selected tool class, at least one of the tool delivery points being a drawer which can be withdrawn from the respective tool storage compartment upon activation by the tool selection device.

2. The automated tool dispenser according to claim 1, wherein, within one or more of the tool classes, the tools are grouped together to form tool units comprising in each case a defined number of tools.

3. The automated tool dispenser according to claim 1, wherein the tool storage compartments of the plurality of tool storage compartments are arranged beside one another or above one another, and each tool storage compartment is assigned a unique tool delivery point.

4. The automated tool dispenser according to claim 1, wherein the tool storage compartments of the plurality of tool storage compartments are arranged beside one another or above one another, and at least some tool storage compartments from the plurality of tool storage compartments are assigned a common tool delivery point.

5. The automated tool dispenser according to claim 4, wherein a drop height of the tools from the tool conveying device to the tool delivery point is smaller in the case of heavier tools than in the case of lighter tools.

6. The automated tool dispenser according to claim 1, wherein the at least one tool compartment is arranged primarily with regard to the parameter of weight.

7. The automated tool dispenser according to claim 1, wherein at least one tool delivery point is constituted in the form of a channel, the channel able to be swiveled between a closed position and an open position about a horizontal axis, and a selected tool being conveyed into the channel for removal.

8. The automated tool dispenser according to claim 1, wherein at least one tool delivery point is constituted in the form of a flap, the flap able to be folded about a horizontal axis between a closed position and an open position, a collection compartment being accessible via the flap, and a selected tool being conveyed into the flap for removal.

9. The automated tool dispenser according to claim 1, wherein the drawer is able to be displaced between a closed position and an open position, and the selected tool is able to be conveyed into the drawer for removal.

10. The automated tool dispenser according to claim 7, wherein the tool delivery point is closed and/or opened by a motor.

11. The automated tool dispenser according to claim 1, wherein the drawer comprises a plurality of tool storage compartments, and the drawer can be withdrawn from the at least one tool delivery module only far enough to access a specified tool storage compartment.

12. The automated tool dispenser according to claim 1, wherein at least one of the at least one tool storage compartment of the at least one tool module is accessible via a door closing the front side of the at least one tool module or of the automated tool dispenser, the tool delivery point being integrated into the door.

13. The automated tool dispenser according to claim 1, wherein a plurality of tool delivery modules are arranged beside one another or above one another.

14. The automated tool dispenser according to claim 1, wherein the plurality of tool conveying devices each comprise a spiral conveyor with an associated tool carrier, and wherein the tools carried by the tool carrier can be conveyed by a rotary drive of the spiral conveyor on the tool carrier in the direction of the tool delivery point.

15. The automated tool dispenser according to claim 14, wherein the tool carriers are each constituted in the form of a profiled element.

16. The automated tool dispenser according to claim 14, wherein the tool carriers convey tools in a suspended manner.

17. The automated tool dispenser according to claim 14, wherein the tool carriers convey the tools lying down or standing.

18. The automated tool dispenser according to claim 14, wherein the tool carriers are arranged in each case in the associated spiral conveyor.

19. The automated tool dispenser according to claim 14, wherein the tool carriers are arranged in each case outside the associated spiral conveyor.

20. The automated tool dispenser according to claim 14, wherein the spiral conveyors are each supported by the associated tool carrier.

21. The automated tool dispenser according to claim 1, wherein the height distance of the tool conveying devices associated with a tool compartment is adjustable relative to the bottom of the tool storage compartment.

22. The automated tool dispenser according to claim 1, wherein the tool delivery point visually or acoustically indicates the presence of a tool.

23. The automated tool dispenser according to claim 1, wherein the tool delivery point indicates tool identification parameters.

24. The automated tool dispenser according to claim 1, wherein it is possible to view inside the at least one tool storage compartment outside the automated tool dispenser.

25. The automated tool dispenser according to claim 1, wherein the dispenser further comprises a display device for displaying the quantity of tools or tool classes that can still be selected.

26. The automated tool dispenser according to claim 9, wherein the drawer, in its pushing direction, extends in its closed position at least partially beneath the tool conveying devices.

27. A method for delivering tools with the aid of the automated tool dispenser according to claim 1, the method comprising:

selecting a tool and inputting the number of tools to be delivered by operation of the tool selection device;

activating the given tool conveying device by means of the tool selection device;

opening the tool delivery point; and closing the tool delivery point after removal of the tool.

28. The automated tool dispenser according to claim 1, wherein at least one of the at least one tool storage compartment is covered with a flap configured to open to allow access to at least one of the tools.

29. The automated tool dispenser according to claim 1, wherein adjacent to the drawer is at least one of the at least one tool conveying device, the at least one of the at least one tool conveying device comprising a spiral conveyor.

30. The automated tool dispenser according to claim 1, wherein each tool storage compartment comprises at least one of the drawers and at least one of the tool conveying devices.

31. The automated tool dispenser according to claim 1, wherein the drawer comprises a bottom and at least one sidewall, and wherein the drawer is slideable along a plane parallel to the bottom.

32. The automated tool dispenser according to claim 1, wherein:

the drawer is adjacent to at least one of the tool conveying devices, and the drawer, in the closed position, extends toward the rear of the respective tool conveying device a length less than sufficient to reach the rear of the respective tool conveying device.

33. The automated tool dispenser according to claim 1, wherein:

the drawer is arranged adjacent to at least one of the tool conveying devices, and the drawer, in the closed position, extends toward the rear of the respective tool conveying device a length sufficient to reach the rear of the respective tool conveying device.

* * * * *